June 6, 1944. W. LANGFORD 2,350,908
FRUIT COLLECTOR
Filed July 3, 1943 2 Sheets-Sheet 1
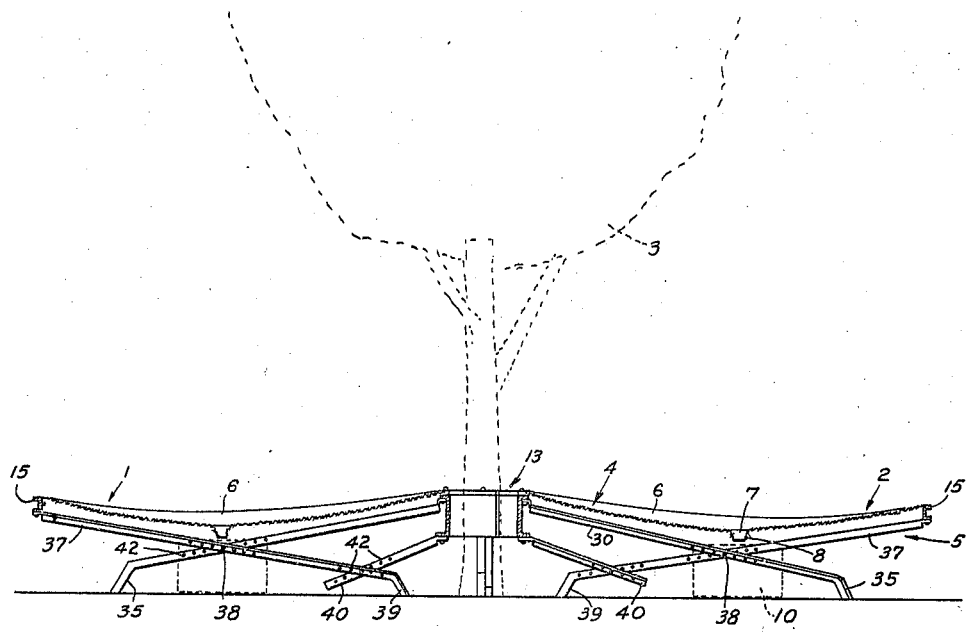
Fig. 1.
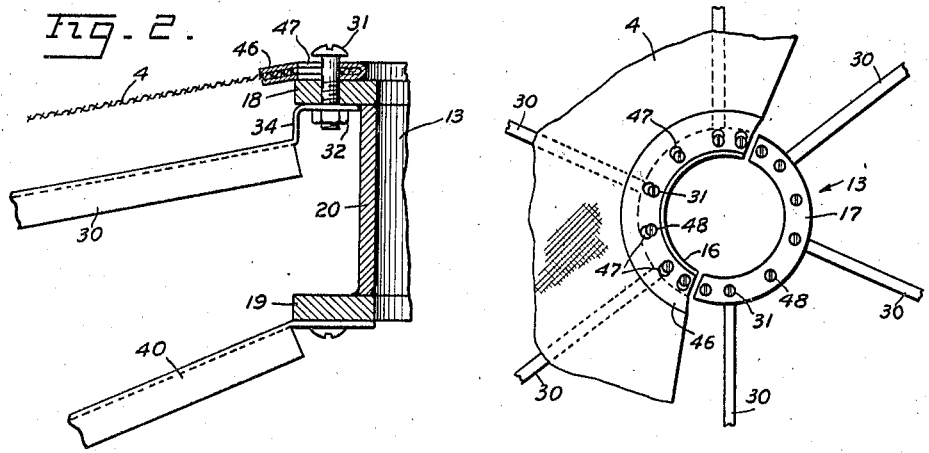
Fig. 2.
Fig. 3.
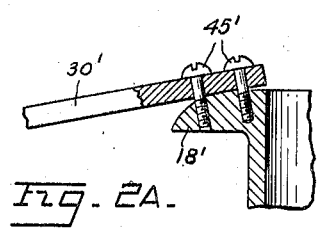
Fig. 2A.
INVENTOR.
WALTER LANGFORD
BY
Alexander Rieboff
HIS ATTORNEY.

June 6, 1944.  W. LANGFORD  2,350,908
FRUIT COLLECTOR
Filed July 3, 1943  2 Sheets-Sheet 2
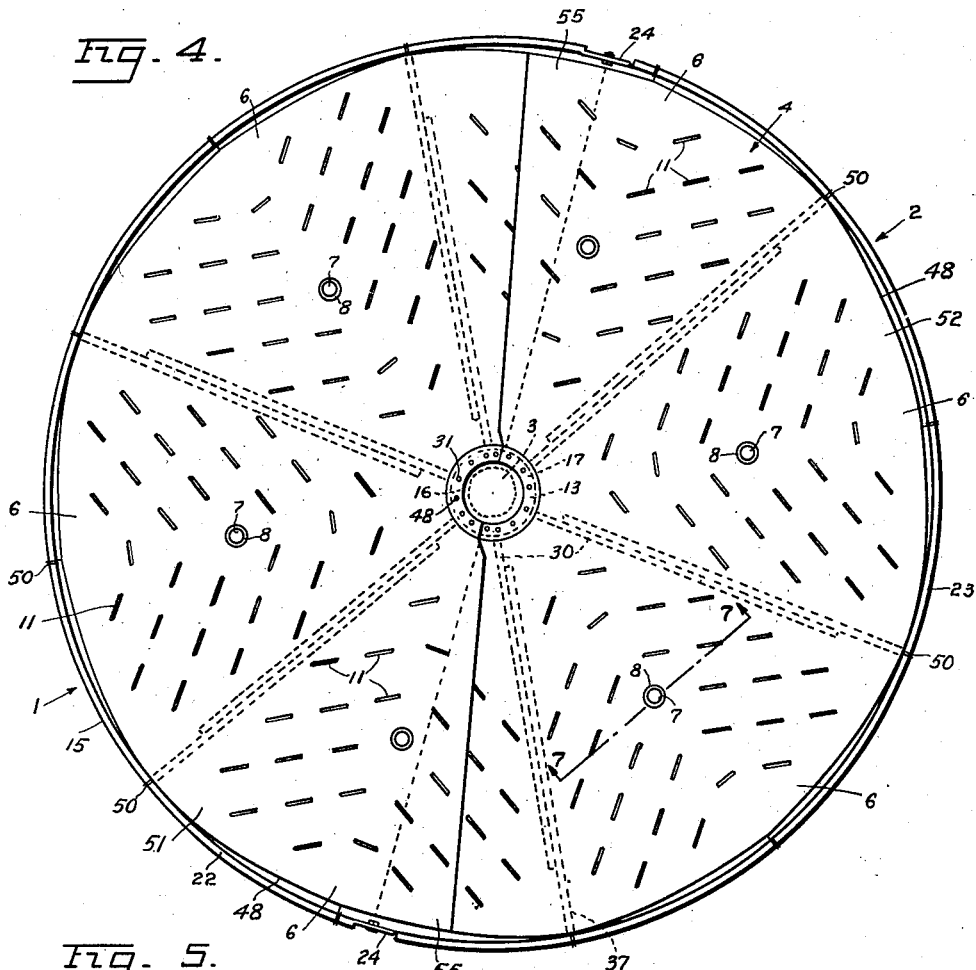
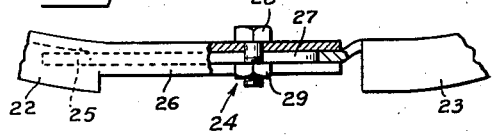
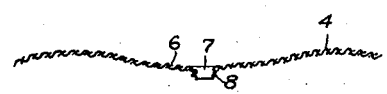
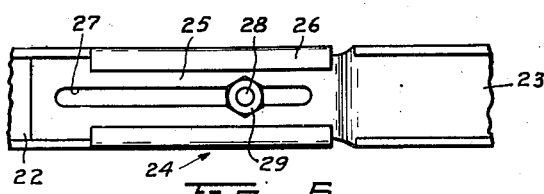
INVENTOR.
WALTER LANGFORD
BY Alexander Riaboff
HIS ATTORNEY Patented June 6, 1944

2,350,908

UNITED STATES PATENT OFFICE 2,350,908

FRUIT COLLECTOR

Walter Langford, Graton, Calif.

Application July 3, 1943, Serial No. 493,475

5 Claims. (Cl. 56—329)

This invention relates to a fruit collector and has for its object to provide a receptacle which is adapted to collect fruits falling from a tree and discharge the same into boxes under the said receptacle.

Another object of this invention is to provide a device of the type described which is adapted to be arranged around a trunk of a fruit tree and having a covering formed into a plurality of troughs or hoppers, each having an outlet at the lowermost section thereof so that a fruit falling from the tree will land in one of the hoppers and will roll downwardly to and through one of the outlets into a box thereunder for that purpose provided.

Another object of this invention is to provide a device of the type described which is simple in construction, cheap to manufacture and maintain and easy to operate.

Other objects and advantages will appear as the specification proceeds and the particular features of the invention will be specifically pointed out in the appended claims.

My invention is illustrated in the accompanying drawings in which:

Fig. 1 is a vertical cross-section through the device.

Fig. 2 is a partial cross-section through an inner ring showing an attachment of the covering and the legs thereto.

Fig. 2A shows a modified method of attaching of the legs to the inner ring.

Fig. 3 is a plan view of the inner ring showing the covering attached to one of the sections thereof.

Fig. 4 is a plan view of the device.

Fig. 5 is a plan view, partly in section of a joint in the outer ring.

Fig. 6 is a front view of the Fig. 5, and

Fig. 7 is a cross-section of the covering taken along the line 7—7 of the Fig. 4.

Generally, the device herein described comprises a receptacle adapted to be installed around a trunk of a fruit tree, said receptacle being formed into a plurality of radical hoppers or troughs each having an outlet at the lowermost portion thereof. The hoppers are arranged contiguously one to another so that a fruit falling from the tree will be invariably caught into one of the hoppers, and will roll down to and through said outlet into a box provided under each outlet for the purpose of collecting said fruits. A plurality of slits may be provided in said receptacle for disposal of dirt, leaves and small twigs.

A frame is provided for supporting said receptacle including means for adjusting the depth of said hoppers and the distance from the outlets to the ground. The receptacle and the frame is preferably split in two or more sections to facilitate handling and assembly of the device.

In detail, the device comprises a receptacle made of two sections 1 and 2 adapted to be arranged around a trunk of a fruit tree 3. The receptacle has a covering 4, which is supported on a frame 5, hereinafter described in detail. The covering 4 is formed with a plurality of radially disposed hoppers 6 each having an outlet 7 at the lowermost portion thereof. The outlet 7 has a short funnel 8 leading to a box 10 which is provided under each of said outlets. A fruit being shaken off the tree falls into one of said hoppers 6 rolls down to and through the outlet 7 and falls into a box 10.

A number of slits 11 may be arranged on said covering for the purpose of sifting dirt, leaves and small twigs which may fall onto said covering 4. The slits 11 are of such width as to by-pass the fruit, but to let dirt, leaves and small twigs pass through the same.

The covering 4 is supported by a frame 5. The latter preferably consists of an inner ring 13 and an outer ring 15, concentric with the inner ring and means for adjustably holding said rings in spaced relation.

The ring 13 is split in two sections 16 and 17, and is formed with an upper and lower lips 18 and 19 respectively and a cylindrical body portion 20 connecting the same. The sections 16 and 17 may be connected together by a conventional hinge if so desired.

The outer ring 15, which may be of any cross-section, is also split in two sections 22 and 23 which are connected by joints 24 arranged on the ends of said sections. Each of said joints 24 comprises a tongue 25 formed at each end of the section 22, slidable into a slide 26 arranged on each end of the section 23. The tongues 25 carry slots 27 through which bolts 28 are passed and tightened by nuts 29, thus firmly connecting both sections together.

Means for holding said rings 13 and 15 in spaced relation consists of a plurality of upper legs 30 attached to the under side of the upper lip 18 by screws 31 and nuts 32. The leg 30 may be of any material or cross-section and is preferably made of angle iron. As shown in Fig. 2 the end of said leg 30 is bent downwardly at 34 so as to be spaced from the flexible covering 4. The free end 35 may be bent downwardly as shown to provide better contact with the ground.

A plurality of complementary legs 37 are attached to the outer ring 15 which legs extend downwardly and toward the inner ring 13. The legs 30 and 37 are bolted or otherwise secured together at the place of their crossing 38. The legs 37 are also preferably bent downwardly at their ends 39 to provide better contact with the ground.

A brace 40 is attached to the lower surface of the lower lip 19 of the inner ring 13 under each of the legs 30, and is extended toward the corresponding leg 37. The free end of said brace 40 is attached to said leg 37, thus forming a rigid connection between said rings. A number of holes 42 is provided in said legs and brace so as to provide for possible adjustments in position of the outer ring 15.

In Fig. 2-A a modified leg 30' is shown attached to the upper convex surface of the upper lip 18' by two bolts 45'. By adjusting the bolts 45' the angle of inclination of the leg 37' to the ground may be varied.

The covering 4 is stretched between the inner ring 13 and outer ring 15, and any means may be employed for the purpose of attaching the covering to the latter rings. In Fig. 2, an inner edge of the covering is shown as being reinforced by a leather strip 46 and provided with a plurality of holes 47. A plurality of retaining screws 48 are arranged in the inner ring 13 which screws as well as the screws 31 pass through said holes 47 and firmly hold the covering which can be easily disconnected from the inner ring 13 by pulling the reinforced edge of the covering off said screws.

The outer edge 48 of the covering is attached to the outer ring 15 preferably by cords or strings 50 equally spaced on said ring. The cords which are located in close proximity to the leg 37 are tightened up considerably more than the cords therebetween so as to permit the covering not only to sag between the rings 13 and 15, as shown in Fig. 1, but also between said legs 37, as shown in Fig. 7, whereby troughs or hoppers 6 are formed therebetween. If desired, a specially shaped covering in form as above described may be attached to said frame 5, in which case the cords 50 connecting said covering to the outer ring will be evenly tightened up.

For the purpose of convenience of handling the covering 4 is preferably split into two sections 51 and 52, the first of which is attached to the inner ring section 16 and outer ring section 22 and the second to the inner ring section 17 and outer ring section 23, thus forming fruit collector sections 1 and 2 respectively. Each covering section has a flap 55 which overlaps the other covering section so as to take care of any misalignment of the outer ring sections 22 and 23. The flap 55 may be attached to the other covering section by any means. It is evident that the device may be divided into more than two sections without departing from the spirit of this invention.

The operation of the device is as follows. Each section of the device is carried to and is installed under and around a fruit tree. The sections 1 and 2 are united together by means of the joints 24 arranged on the outer ring sections 22 and 23. The boxes 10 are placed under the outlets 7, whereupon an operator shakes the tree. Fruits fall on the covering and into one of the hoppers 6 and roll downwardly to and through a respective outlet 7 into a box 10. It shall be noted that due to spacing of the covering 4 above the legs 30 and 37, a falling fruit will always land upon a soft covering, whereby any injury to a fruit is avoided which otherwise would have been possible. Dirt, leaves and small twigs which fall with the fruits, will also land upon the covering and will be disposed of through the slits 11. The depth of the hoppers 6 and the distance of the covering 4 from the ground may be easily changed by changing the position of the legs 37 in relation to the legs 30 and the braces 40.

Having thus described my invention, I claim:

1. A fruit collector comprising a cover circumferentially undulating and radially concave, each concave undulation having an outlet at its lowermost portion; a frame for supporting said covering consisting of an inner ring, an outer ring concentric with the inner ring, plurality of legs radially extending from said inner ring, and plurality of corresponding legs extending inwardly from the outer ring, and means for connecting first mentioned legs with the corresponding second mentioned legs.

2. A fruit collector, comprising a cover adapted to catch falling fruit, said cover having outlets for discharging said fruit into containers; means for supporting said cover around a fruit tree and in spaced relation to the ground; said means, including an inner ring and an outer ring between which said cover is stretched; a number of legs extending from the inner ring radially, outwardly and downwardly, and a corresponding number of complimentary legs extending from the outer ring radially, inwardly and downwardly; means for connecting the first mentioned legs with the second mentioned legs in pairs; and a plurality of braces each of which extends from the inner ring and is connected to a corresponding complimentary leg.

3. A fruit collector comprising a cover adapted to catch falling fruit, said cover having outlets for discharging said fruit into containers; means for supporting said cover around a fruit tree and in spaced relation to the ground, said means including an inner ring and an outer ring between which said cover is stretched; a number of legs extending from the inner ring radially, outwardly and downwardly, and a corresponding number of complimentary legs extending from the outer ring radially, inwardly and downwardly; means for connecting the first mentioned legs with the second mentioned legs in pairs; and adjustable means for firmly holding each pair of said legs in a desired position.

4. A fruit collector comprising a cover circumferentially undulating and radially concave, each concave undulation having an outlet at its lowermost portion; a frame for supporting said covering consisting of an inner ring, an outer ring concentric with the inner ring, plurality of legs extending from said inner ring, and a plurality of complimentary legs extending from the inner ring, each of the first mentioned legs being firmly and adjustably connected with a corresponding complimentary leg so as to hold said cover in spaced relation to the ground.

5. A fruit collector comprising a cover circumferentially undulating and radially concave, each concave undulation having an outlet at its lowermost portion; a frame for supporting said covering consisting of an inner ring, an outer ring concentric with the inner ring, a plurality of legs radially and outwardly extending from the inner ring; means carried by the outer ring, which means in cooperation with said legs firmly and adjustably hold the rings in spaced relation to each other and to the ground.

WALTER LANGFORD.